United States Patent
Nesbitt et al.

(10) Patent No.: US 9,587,563 B2
(45) Date of Patent: Mar. 7, 2017

(54) SOUND ATTENUATION APPARATUS AND METHOD

(71) Applicant: THE BOEING COMPANY, Chicago, IL (US)

(72) Inventors: Eric H. Nesbitt, Duvall, WA (US); Justin H. Lan, Bothell, WA (US); Thonse R. S. Bhat, Renton, WA (US); Charles W. Rust, Seattle, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 14/804,867

(22) Filed: Jul. 21, 2015

(65) Prior Publication Data

US 2017/0022904 A1    Jan. 26, 2017

(51) Int. Cl.
| F01N 1/24 | (2006.01) |
| F02C 7/24 | (2006.01) |
| F02K 1/34 | (2006.01) |
| B64D 41/00 | (2006.01) |

(52) U.S. Cl.
CPC .............. *F02C 7/24* (2013.01); *B64D 33/06* (2013.01); *F01N 1/24* (2013.01); *B64D 2041/002* (2013.01)

(58) Field of Classification Search
CPC .............. F02C 7/24; F01N 1/24; B64D 33/06
USPC ........................................ 181/222, 292, 290
See application file for complete search history.

(56) References Cited

U.S. PATENT DOCUMENTS

| 2,988,302 A | 6/1961 | Smith |
| 3,542,152 A | 11/1970 | Adamson et al. |
| 3,890,060 A | 6/1975 | Lipstein |
| 4,130,175 A | 12/1978 | Hehmann |

(Continued)

FOREIGN PATENT DOCUMENTS

| EP | 0895222 | 2/1999 |
| EP | 2517959 | 10/2012 |

(Continued)

OTHER PUBLICATIONS

Bielak, et al. "NASA / CR-1999-209002; Advanced Turbofan Duct Liner Concepts", National Aeronautics and Space Administration, Langley Research Center Contract NAS1-20090, Feb. 1999.

(Continued)

*Primary Examiner* — Forrest M Phillips
(74) *Attorney, Agent, or Firm* — Perman & Green, LLP (57) ABSTRACT

An aircraft auxiliary power unit sound attenuation apparatus includes a perforated body having a center aperture through which exhaust fluid passes, a backing member outwardly offset from the perforated body, a plurality of connecting members coupling the perforated body to the backing member to form a locally reacting sound attenuation member having a plurality of channels spanning outwardly from the perforated body to the backing member, and a bulk absorber disposed in each of the plurality of channels where the bulk absorber is in fluid communication with the exhaust fluid, where the locally reacting sound attenuation member is in fluid communication with an auxiliary power unit of an aircraft so that the plurality of channels are oriented in a direction crossing a pressure drop direction of an exhaust fluid flow passing through the center aperture and each channel circumscribes the center aperture.

22 Claims, 7 Drawing Sheets

(56) References Cited

U.S. PATENT DOCUMENTS

| | | | |
|---|---|---|---|
| 4,235,303 A * | 11/1980 | Dhoore | B64D 33/02 |
| | | | 181/214 |
| 4,298,090 A | 11/1981 | Chapman | |
| 4,441,578 A | 4/1984 | Rose | |
| 4,531,362 A | 7/1985 | Barry et al. | |
| 4,751,979 A | 6/1988 | Wiseman | |
| 4,828,175 A | 5/1989 | Heufler et al. | |
| 4,947,958 A | 8/1990 | Snyder | |
| 5,414,232 A | 5/1995 | Wilson | |
| 5,543,198 A | 8/1996 | Wilson | |
| 5,594,216 A | 1/1997 | Yasukawa et al. | |
| 5,706,651 A | 1/1998 | Lillibridge et al. | |
| 6,439,340 B1 | 8/2002 | Shirvan | |
| 6,615,576 B2 * | 9/2003 | Sheoran | B64D 33/06 |
| | | | 181/213 |
| 6,672,424 B2 * | 1/2004 | Gadefait | F02K 1/827 |
| | | | 181/222 |
| 7,267,297 B2 * | 9/2007 | Campbell | B64D 33/06 |
| | | | 181/222 |
| 7,431,125 B2 | 10/2008 | Williams | |
| 7,448,133 B2 | 11/2008 | Williams et al. | |
| 8,037,967 B2 * | 10/2011 | Mercat | F02K 1/827 |
| | | | 181/213 |
| 8,220,588 B2 | 7/2012 | Thrash et al. | |
| 8,413,922 B2 | 4/2013 | Porte et al. | |
| 8,579,225 B2 | 11/2013 | Mardjono et al. | |
| 8,602,346 B2 | 12/2013 | Porte et al. | |
| 8,727,707 B2 | 5/2014 | Schwaller | |
| 8,733,500 B1 | 5/2014 | Ayle | |
| 8,763,751 B2 | 7/2014 | Starobinski et al. | |
| 8,820,477 B1 | 9/2014 | Herrera et al. | |
| 8,840,059 B2 | 9/2014 | Vauchel et al. | |
| 8,899,512 B2 | 12/2014 | Vauchel et al. | |
| 9,127,452 B1 | 9/2015 | Winfield et al. | |
| 9,260,859 B2 | 2/2016 | Matan et al. | |
| 9,403,599 B2 | 8/2016 | Binks et al. | |
| 2002/0139120 A1 * | 10/2002 | Sheoran | B64D 33/06 |
| | | | 60/772 |
| 2005/0263346 A1 * | 12/2005 | Nishimura | E04B 1/86 |
| | | | 181/290 |
| 2007/0272483 A1 * | 11/2007 | Morin | F02C 7/045 |
| | | | 181/292 |
| 2010/0213002 A1 | 8/2010 | Oboodi et al. | |
| 2011/0133025 A1 | 6/2011 | Vauchel et al. | |
| 2011/0244150 A1 | 10/2011 | Thrash et al. | |
| 2011/0303786 A1 | 12/2011 | Starobinski et al. | |
| 2012/0090693 A1 | 4/2012 | Chelin et al. | |
| 2012/0168248 A1 * | 7/2012 | Burak | F01D 25/162 |
| | | | 181/292 |
| 2012/0273611 A1 | 11/2012 | Francisco et al. | |
| 2014/0133964 A1 | 5/2014 | Ayle | |
| 2015/0292413 A1 * | 10/2015 | Soria | F02K 1/827 |
| | | | 181/290 |
| 2015/0377128 A1 * | 12/2015 | Copiello | B64D 33/02 |
| | | | 415/119 |
| 2016/0024963 A1 | 1/2016 | Lumbab et al. | |
| 2016/0039528 A1 | 2/2016 | Caruel | |

FOREIGN PATENT DOCUMENTS

| | | |
|---|---|---|
| WO | 9101034 | 1/1991 |
| WO | 9108379 | 6/1991 |
| WO | 2008069844 | 6/2008 |
| WO | 2010012900 | 2/2010 |
| WO | 2010040837 | 4/2010 |

OTHER PUBLICATIONS

European Search Report, European Application No. 16179914, dated Dec. 15, 2016.

European Search Report, European Application No. 16179907, dated Dec. 15, 2016.

* cited by examiner

SOUND ATTENUATION APPARATUS AND METHOD

BACKGROUND

Generally, turbine engines, such as used in aircraft, can be sources of unwanted noise while the aircraft is parked or taxying at the airport or during takeoff and landing. Various noise reduction methods have been implemented to address the unwanted noise generated by the turbine engines. One such noise reduction method includes the use of acoustic liners that include Helmholtz resonators or bulk noise suppression material. The acoustic liners are flat or contoured and are generally placed on the interior surface of an engine or an auxiliary power unit inlet and/or exhaust ducts, as necessary, to reduce noise produced by the engine or auxiliary power unit. The bulk noise suppression material has not generally been implemented with respect to turbine engines due to, for example, liquid absorption/retention.

SUMMARY

Accordingly, apparatus and method, intended to address the above-identified concerns, would find utility.

One example of the present disclosure relates to an aircraft auxiliary power unit sound attenuation apparatus that comprises: a perforated body having a center aperture through which exhaust fluid passes; a backing member outwardly offset from the perforated body; a plurality of connecting members coupling the perforated body to the backing member to form a locally reacting sound attenuation member having a plurality of channels spanning outwardly from the perforated body to the backing member; and a bulk absorber disposed in each of the plurality of channels where the bulk absorber is in fluid communication with the exhaust fluid; wherein the locally reacting sound attenuation member is in fluid communication with an auxiliary power unit of an aircraft so that the plurality of channels are oriented in a direction crossing a pressure drop direction of an exhaust fluid flow passing through the center aperture and each channel circumscribes the center aperture.

One example of the present disclosure relates to an aircraft auxiliary power unit that comprises: an exhaust outlet; a locally reacting sound attenuation member in fluid communication with the exhaust outlet, the locally reacting sound attenuation member including a perforated body having a center aperture through which exhaust fluid passes, a backing member outwardly offset from the perforated body, a plurality of connecting members coupling the perforated body to the backing member to form a locally reacting sound attenuation member having a plurality of channels spanning outwardly from the perforated body to the backing member; and a bulk absorber disposed in each of the plurality of channels where the bulk absorber is in fluid communication with the exhaust fluid; wherein the locally reacting sound attenuation member is in fluid communication with the exhaust outlet so that the plurality of channels are oriented in a direction crossing a pressure drop direction of an exhaust fluid flow passing through the center aperture and each channel circumscribes the center aperture.

One example of the present disclosure relates to a method for aircraft auxiliary power unit sound attenuation, the method comprising: flowing fluid in an exhaust outlet of an aircraft auxiliary power unit; receiving at least a portion of the fluid in perforations of the exhaust outlet so that the portion of the fluid flows through the perforations into at least one radial channel of the exhaust outlet; and attenuating acoustic waves with a bulk absorber disposed within each of the at least one radial channel.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

In the block diagram(s) referred to above, solid lines, if any, connecting various elements and/or components may represent mechanical, electrical fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Figure 1:
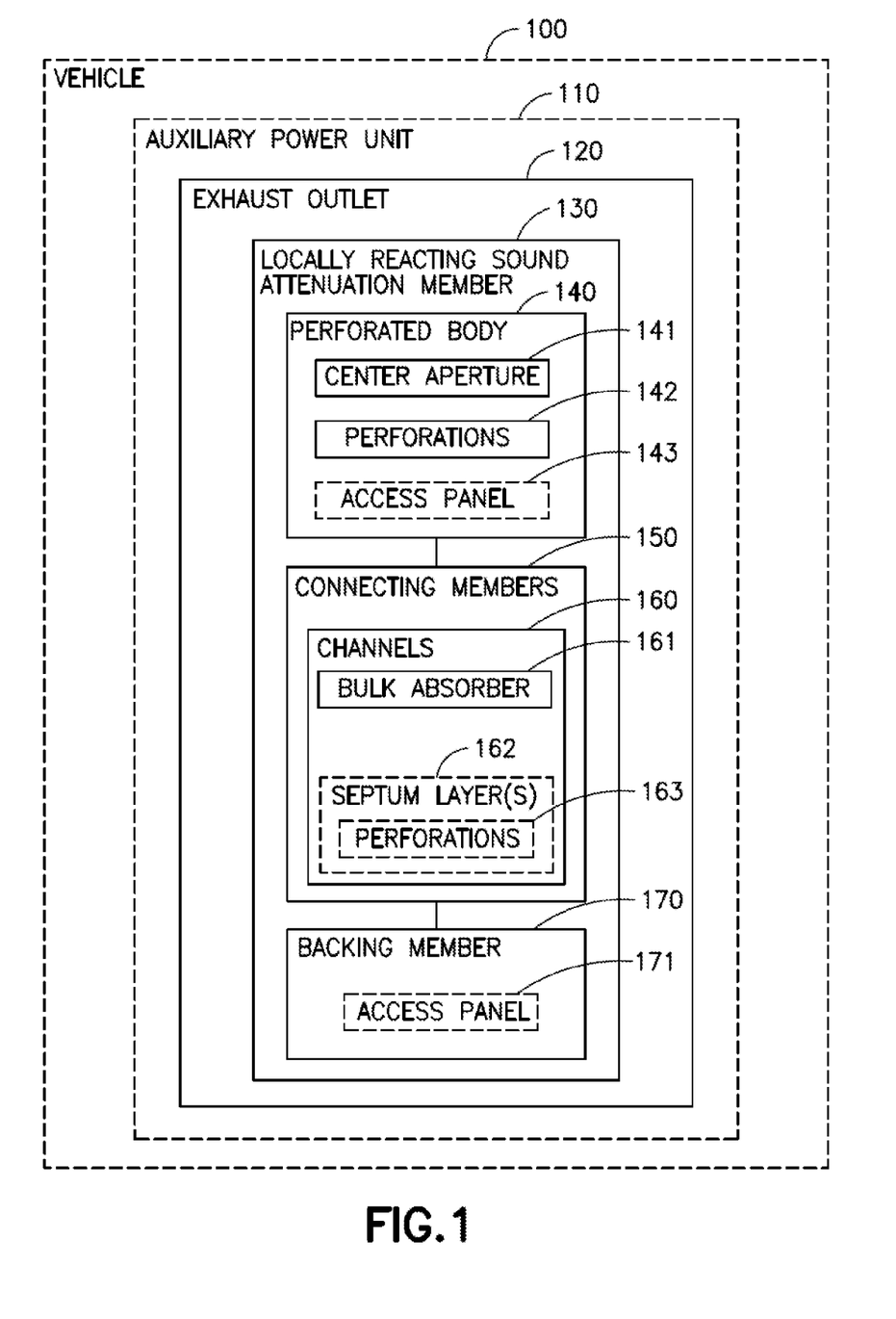
FIG. 1 is a block diagram of a sound attenuation apparatus, according to aspects of the present disclosure.

Referring to FIG. 1, a block diagram of a vehicle 100 having a locally reacting sound attenuating member 130 in accordance with aspects of the present disclosure is illustrated. The vehicle 100 is in one aspect an aircraft such as aircraft 1002 illustrated in FIG. 10 where the locally reacting sound attenuation member 130 is connected to an auxiliary power unit that includes an exhaust outlet 120 to which the locally reacting sound attenuation member 130 is connected or integral to. In other aspects the vehicle 100 is a land based, marine or other aerospace vehicle having an exhaust outlet in which the locally reacting sound attenuation member 130 may be employed.

Figure 2:
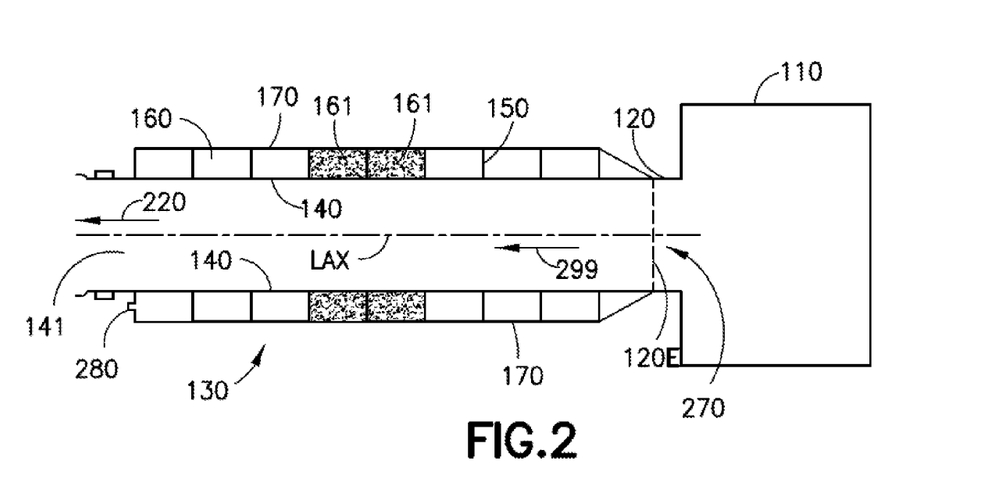
FIG. 2 is a schematic illustration of a sound attenuation apparatus, according to aspects of the present disclosure.
Figure 3:
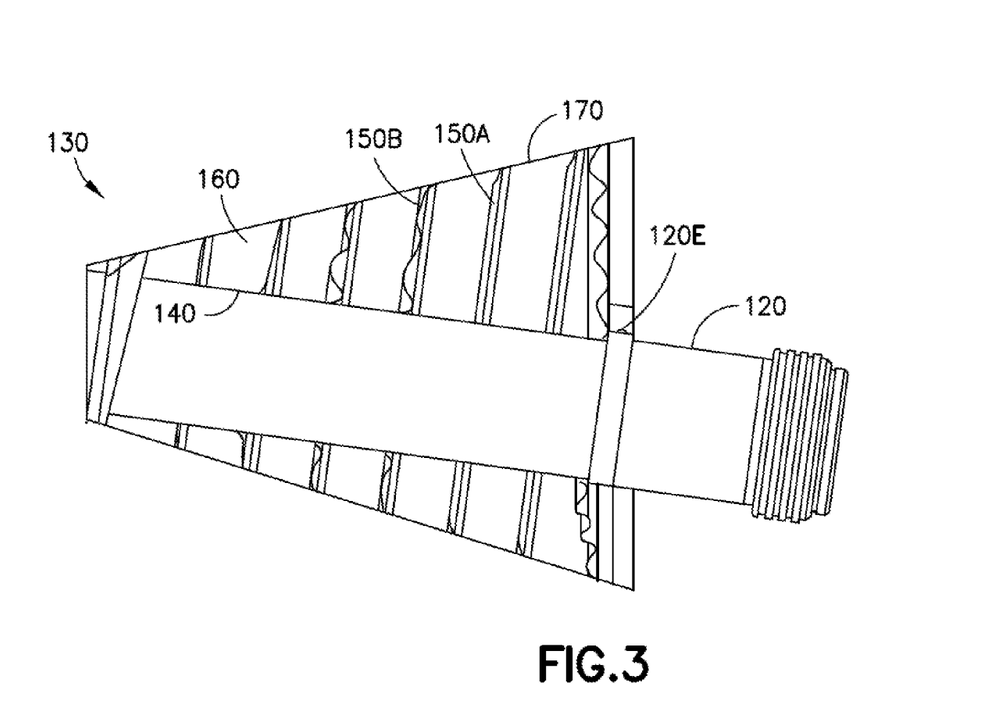
FIG. 3 is a schematic illustration of a sound attenuation apparatus, according to aspects of the present disclosure.

In one aspect, referring to FIGS. 1, 2 and 3, the auxiliary power unit 110 includes an exhaust outlet 120 where, in one aspect, at least a portion of the exhaust outlet 120 passes through a portion of, for example, an airframe 1018 (FIG. 10) of the vehicle 100. The exhaust outlet is, in one aspect, a cylindrical member having a passage 270 through which exhaust fluid from the auxiliary power unit passes. In one aspect, the locally reacting sound attenuation member 130 is disposed on or is integral to the exhaust outlet 1120 so as to substantially form an annular ring around the exhaust outlet 120 as described herein. In one aspect, as illustrated in FIG. 3, the locally reacting sound attenuation member 130 has a conical shape and forms, for example, an aerodynamic portion of the airframe 1018, such as a tail cone. In other aspects, the locally reacting sound attenuation member 130 is a cylindrical unit that is disposed within, for example, the airframe 1018. In one aspect, the locally reacting sound attenuation member 130 has a longitudinal axis LAX that extends along the direction of exhaust fluid flow 220.

Referring to FIGS. 1, 2, 3, 4 and 5 each locally reacting sound attenuation member 130 includes a perforated body 140, a plurality of connecting members 150 and a backing member 170. In one aspect, one or more of the perforated body 140, a plurality of connecting members 150 and a backing member 170 are constructed of titanium and/or inconel. In another aspect, one or more of the perforated body 140, a plurality of connecting members 150 and a backing member 170 are constructed of a nickel alloy. In still other aspects, one or more of the perforated body 140, a plurality of connecting members 150 and a backing member 170 are constructed of a ceramic matrix composite.

In one aspect, the perforated body 140 is formed by the exhaust outlet 120, for example, the exhaust outlet 120 includes all of the features of the perforated body 140 described herein. In other aspects the perforated body 140, and the locally reacting sound attenuation member 130 as a whole, is coupled to an end 120E of the exhaust outlet 120 to form a common exhaust fluid flow aperture, through which exhaust fluid flow 220 passes, with the exhaust outlet 120. In one aspect the perforated body 140 is a cylindrical or semi-cylindrical member that forms a center aperture 141. The perforated body 140 includes a plurality of perforations 142 that provide for fluid communication between a fluid flow, such as exhaust fluid flow 220, and channels 160 formed by the plurality of connecting members 150. In one aspect, the plurality of perforations 142 provide the perforated body 140 with a percent open area of about 15% or greater. In other aspects the percent open is about 15% or less. In one aspect, the perforated body 140 is an expanded metal member while in other aspects, the perforations 142 are formed in the perforated body 140 in any suitable manner such as by drilling, punching, stamping and/or cutting.

Figure 7A:
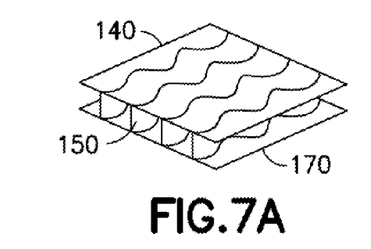
FIGS. 7A-7I are schematic illustrations of portions of a sound attenuation apparatus, according to aspects of the present disclosure.
Figure 7B:
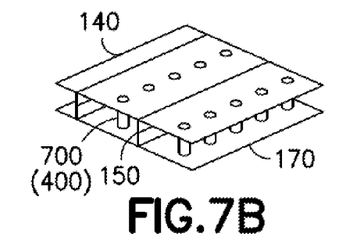
Figure 7C:
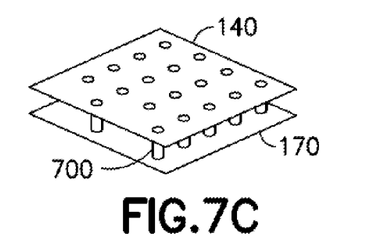
Figure 7D:
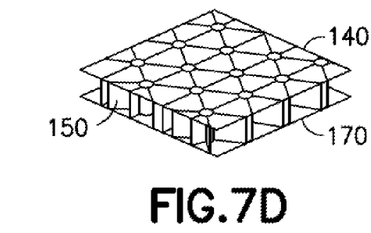
Figure 7E:
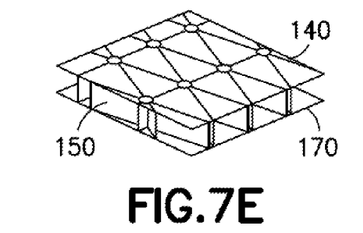
Figure 7F:
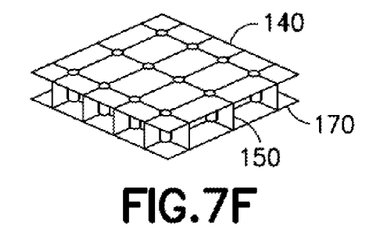
Figure 7G:
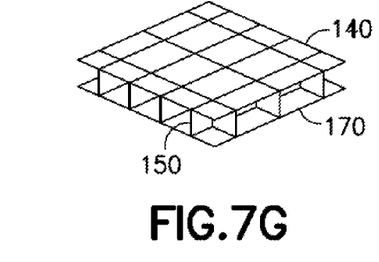
Figure 7H:
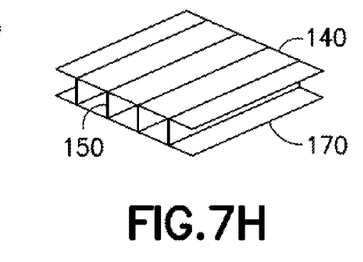
Figure 7I:
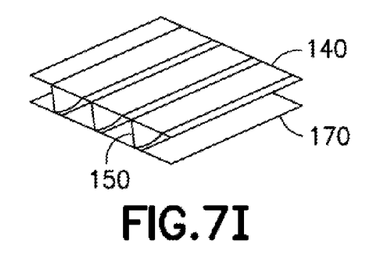

In one aspect, each of the plurality of connecting members 150 couples the perforated body 140 to the backing member 170 to form a plurality of channels 160 that span outwardly from the perforated body 140 to the backing member 170 where the connecting members 150 extend along a longitudinal axis (e.g., with respect to the length L of the channels 160) of each channel 160. In one aspect, the plurality of channels 160 are oriented in a direction crossing (e.g. substantially normal to) a direction 299 of fluid flow pressure drop passing through the exhaust outlet 120 and the center aperture 141. Referring to FIGS. 7A-7I, exemplary channel 160 configurations are illustrated. In one aspect, the connecting members 150 have a circumferentially extending sinewave configuration as illustrated in FIG. 7A that extends around the longitudinal axis LAX of the local reacting sound attenuation member 130. In one aspect the connecting members 150 circumferentially extend linearly, as illustrated in FIG. 7H, around the longitudinal axis LAX of the local reacting sound attenuation member 130. In one aspect, the connecting members form a truss core, as illustrated in FIG. 7I, that circumferentially extends around the longitudinal axis LAX of the local reacting sound attenuation member 130. In other aspects, the channels 160 include columns or posts 700 disposed between the connecting members 150 where the columns or posts 700 also couple the perforated body 140 to the backing member 170 as illustrated in FIG. 7B. In still other aspects, the channels 160 are formed by columns or posts 700 as illustrated in FIG. 7C where one or more channels are in fluid communication with each other. In other aspects, the connecting members 150 have any suitable configuration such as, for example, a triangle isogrid configuration as illustrated in FIG. 7D, an elongated triangle isogrid configuration as illustrated in FIG. 7E, an interrupted rectangular core configuration as illustrated in FIG. 7F and a rectangular core configuration as illustrated in FIG. 7G. Referring to FIG. 3, the locally reacting sound attenuation member 130, in one aspect, includes connecting members 150 that have different configurations. For example, as illustrated in FIG. 3 the connecting members 150 include a combination of at least circumferentially linearly extending connecting members 150A and circumferentially extending sinewave connecting members 150B.

Referring again to FIGS. 1, 2, 3, 4 and 5, in one aspect, a longitudinal length L of each channel 160 circumferentially extends around a full circumference of the exhaust outlet 120 and/or center aperture 141. For example, as illustrated in FIG. 5, the locally reacting sound attenuation member 130 may include, for example, two halves or sections 130A, 130B (e.g., the perforated body 140 and the backing member 170 are semi-cylindrical members) where the channels 160A, 160B extend a full length of their respective sections 130A, 130B. In other aspects the locally reacting sound attenuation member 130 includes more than two sections. In one aspect, where the ends of the channels 160A, 160B abut each other, one channel 160A is isolated from the other channel 160B by a partition or wall 570. In other aspects, where the ends of the channels 160A, 160B abut each other, one channel 160A is in fluid communication with the other channel 160B where the ends of each channel are open (e.g. there is no partition or wall) and the channels 160A, 160B are substantially aligned with each other so as to form a single substantially continuous channel. In other aspects, the perforated body 140 and backing member 170 of the locally reacting sound attenuation member 130 may each be formed as a single unitary piece which when assembled are placed one inside the other with the connecting members 150 therebetween so that each of the channels 160 is a single substantially continuous channel that circumscribes the center aperture 141 and/or exhaust outlet 120.

In one aspect, each of the channels 160 has a width W, in the direction crossing the direction 299 of fluid flow pressure drop passing through the center aperture 141 or exhaust outlet 120. In one aspect the width W is about one (1) inch while in other aspects the width is more or less than about one (1) inch. The width W substantially prevents sound propagation, inside the respective channel 160, substantially parallel to a surface 160S of the channel 160 in the direction crossing the direction 299 of fluid flow pressure drop passing through the center aperture 141 or exhaust outlet 120. For example, in one aspect, the width W prevents pressure driven backflow, upstream within the channel, back into the fluid flow 220.

Figure 6:
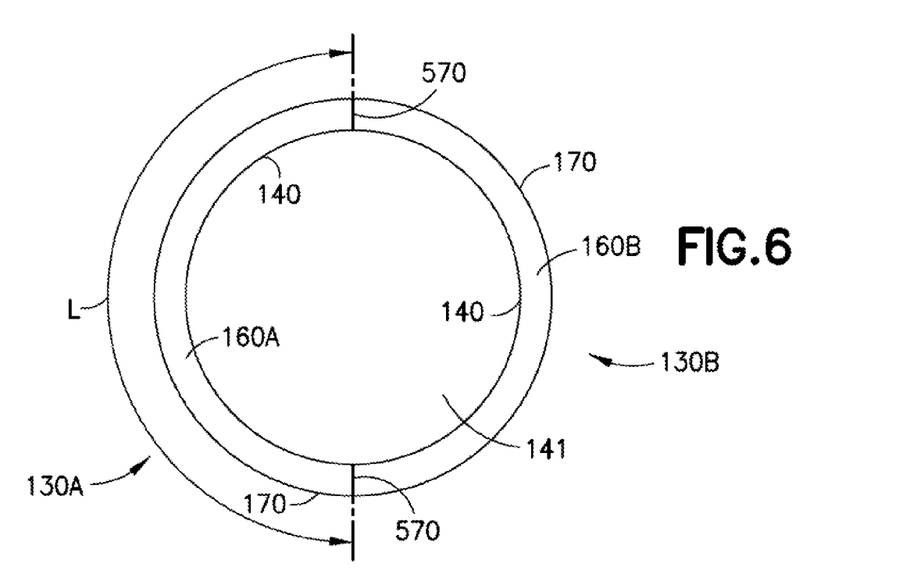
FIG. 6 is a schematic illustration of a portion of a sound attenuation apparatus, according to aspects of the present disclosure.

Referring to FIGS. 1 and 6, in one aspect, at least one septum layer 162 is disposed in one or more channels 160 between the perforated body 140 and the backing member 170 where the at least one septum layer 162 divides each channel 160 into at least two portions 160C, 160D. In one aspect the at least one septum layer 162 includes perforations 163 that place the at least two portions 160C, 160D in fluid communication with each other. In one aspect one of the at least two portions 160C, 160D includes or otherwise forms a fluid (e.g. liquid) drainage path and is in fluid communication with a drain member 280. In one aspect the drain member 280 may also be provided in a locally reacting sound attenuation member 130 where the channels 160 are not divided into portions as illustrated in FIG. 2. In one aspect the drainage path may extend between channels and provide a path for liquid to flow from one channel 160 to another channel 160 (e.g., between channels 160) and ultimately exit the locally reacting sound attenuation member 130 through the drain member 280.

Figure 4:
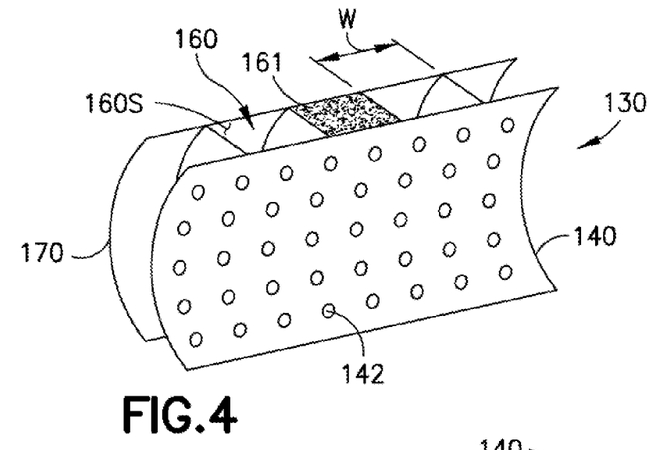
FIG. 4 is a schematic illustration of a portion of a sound attenuation apparatus, according to aspects of the present disclosure.
Figure 5:
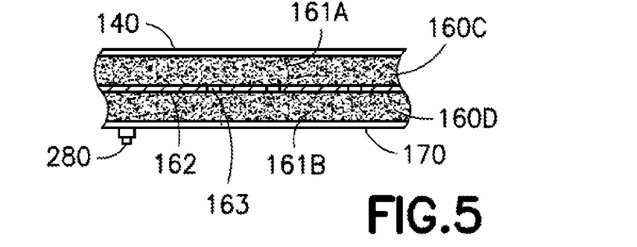
FIG. 5 is a schematic illustration of a portion of a sound attenuation apparatus, according to aspects of the present disclosure.

Referring to FIGS. 2, 4 and 6, in one aspect, a bulk absorber 161 is disposed in each of the channels 160 for attenuating sound produced by the auxiliary power unit 110. In one aspect, such as where each channel includes at least one septum layer 162, at least one of the portions 160C, 160D includes a bulk absorber 161A, 161B. In one aspect, each portion 160C, 160D includes the same type of bulk absorber 161A, 161B (e.g., both bulk absorbers 161A, 161B have the same characteristics) while in other aspects, each of the portions 160C, 160D includes dissimilar bulk absorbers 161A, 161B (e.g., bulk absorber 161A has different characteristics than bulk absorber 161B). In other aspects, one of the portions 160C, 160D includes the bulk absorber while the other portion 160C, 160D is empty (e.g. does not contain the bulk absorber 161). In one aspect the bulk absorber 161 comprises a high temperature bulk absorber material capable of withstanding temperatures from about 600° F. to about 1100° F., or from about 600° F. to about 800° F., or from about 800° F. to about 1100° F. In other aspects, the bulk absorber material is capable of withstanding temperatures above about 1100° F. In one aspect, the perforations 142 in the perforated body 140 place the bulk absorber 161 in direct fluid communication with the fluid flow 220 of the auxiliary power unit 110. In one aspect, one or more of the perforated body 140 and backing member 170 includes an access panel 143, 171 that provides access to the bulk absorber 161 in each of the channels 160.

In accordance with the present disclosure, the perforations 142 in the perforated body 140 can be larger than the apertures of Helmholtz resonators as it is the bulk absorber of the present disclosure that attenuates the sound rather than a size of the cavity and/or a size of the aperture leading to the cavity. The perforations 142 in the perforated body 140 can have any shape, size and or orientation (with respect to the fluid flow 220) that provides for a predetermined percent open area which in one aspect is about 15% or greater, as described above. The aspects of the present disclosure, in one aspect, reduce an amount of acoustically treated area over conventional liners (e.g., provides increased sound attenuation for a given amount of acoustically treated area). The bulk absorber 161 within the channels 160 of the present disclosure are, in one aspect, thermal insulators that may reduce the need for additional thermal insulation around the exhaust outlet 120 of the auxiliary power unit 110.

Figure 8:
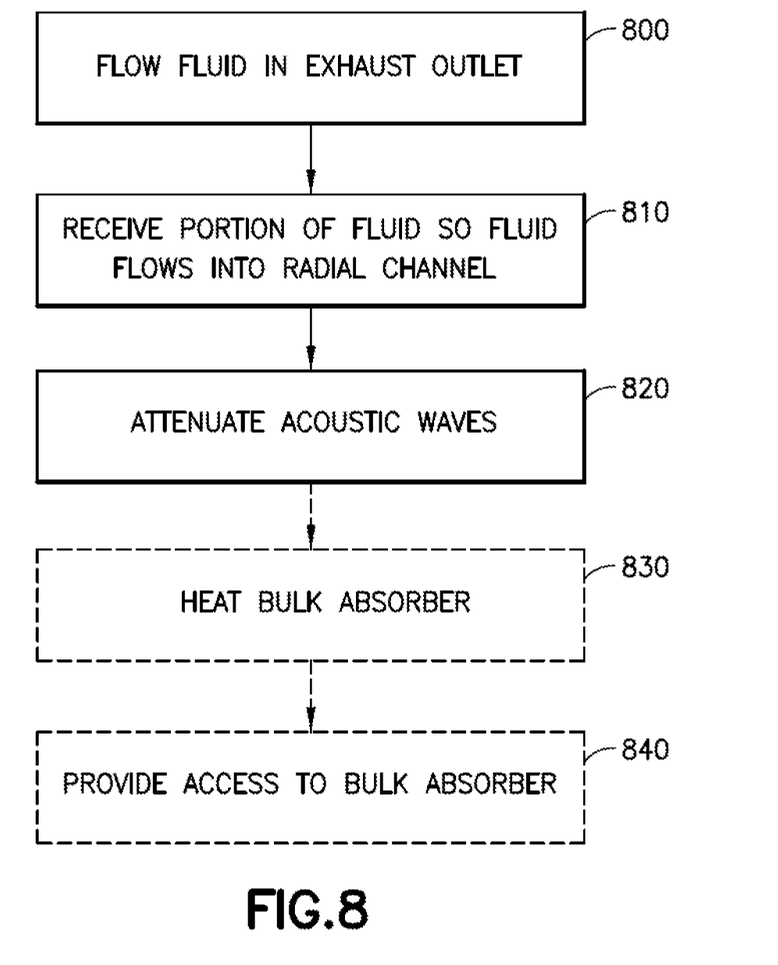
FIG. 8 is a flow diagram of a method, according to aspects of the present disclosure.

Referring to FIG. 8, an exemplary method of attenuating sound from an auxiliary power unit 110 will be described. In one aspect, the method includes flowing fluid in or through an exhaust outlet 120 of an aircraft auxiliary power unit 110 (FIG. 8, Block 800). For example, during operation of the auxiliary power unit fluid flow 220 is provided through the exhaust outlet 120. A portion of the fluid flow 220 is received in perforations 142 of the exhaust outlet 120, such as in the perforated body 140, so that the portion of the fluid flow 220 flows through the perforations 142 into at least one radial channel 160 of the exhaust outlet 120 (FIG. 8, Block 810). Acoustic waves are attenuated with the bulk absorber 161 disposed within each of the at least one radial channel 160 (FIG. 8, Block 820). The channels 160 are, in one aspect, radial in that the channels radially extend from the center aperture 141. In one aspect, attenuating the acoustic waves includes preventing sound propagation inside the at least one radial channel 160 substantially parallel to the surface 160S of the at least one radial channel in the direction of the pressure drop direction 299 of the fluid flow 220. In one aspect, the bulk absorber 161 is heated with the portion of the fluid flow 220 to vaporize liquids contained within the bulk absorber 161 (FIG. 8. Block 830). In one aspect, access to the bulk absorber 161 is provided through the perforated body 140 or the backing member 170 of the exhaust outlet 120, such as through one or more of access panels 143, 171 (FIG. 8, Block 840). In one aspect, the bulk absorber 161 is inserted into each radial channel 160 by pulling the bulk absorber through the radial channel 160 while in other aspects the bulk absorber is inserted into each radial channel 160 by spraying or injecting the bulk absorber into the radial channel 160. In other aspects the bulk absorber 161 is wrapped around the perforated body 140 during assembly of the locally reacting sound attenuation member 130.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 9:
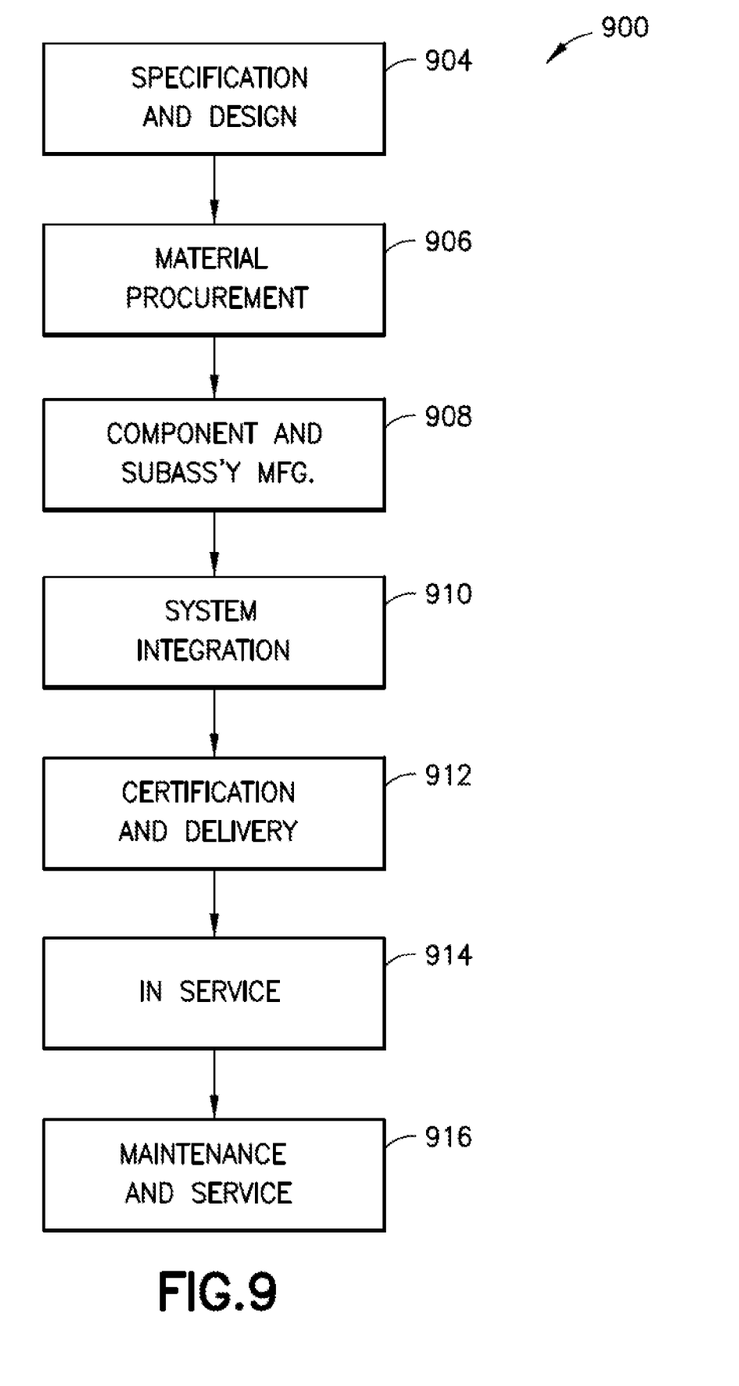
FIG. 9 is a flow diagram of aircraft production and service methodology.
Figure 10:
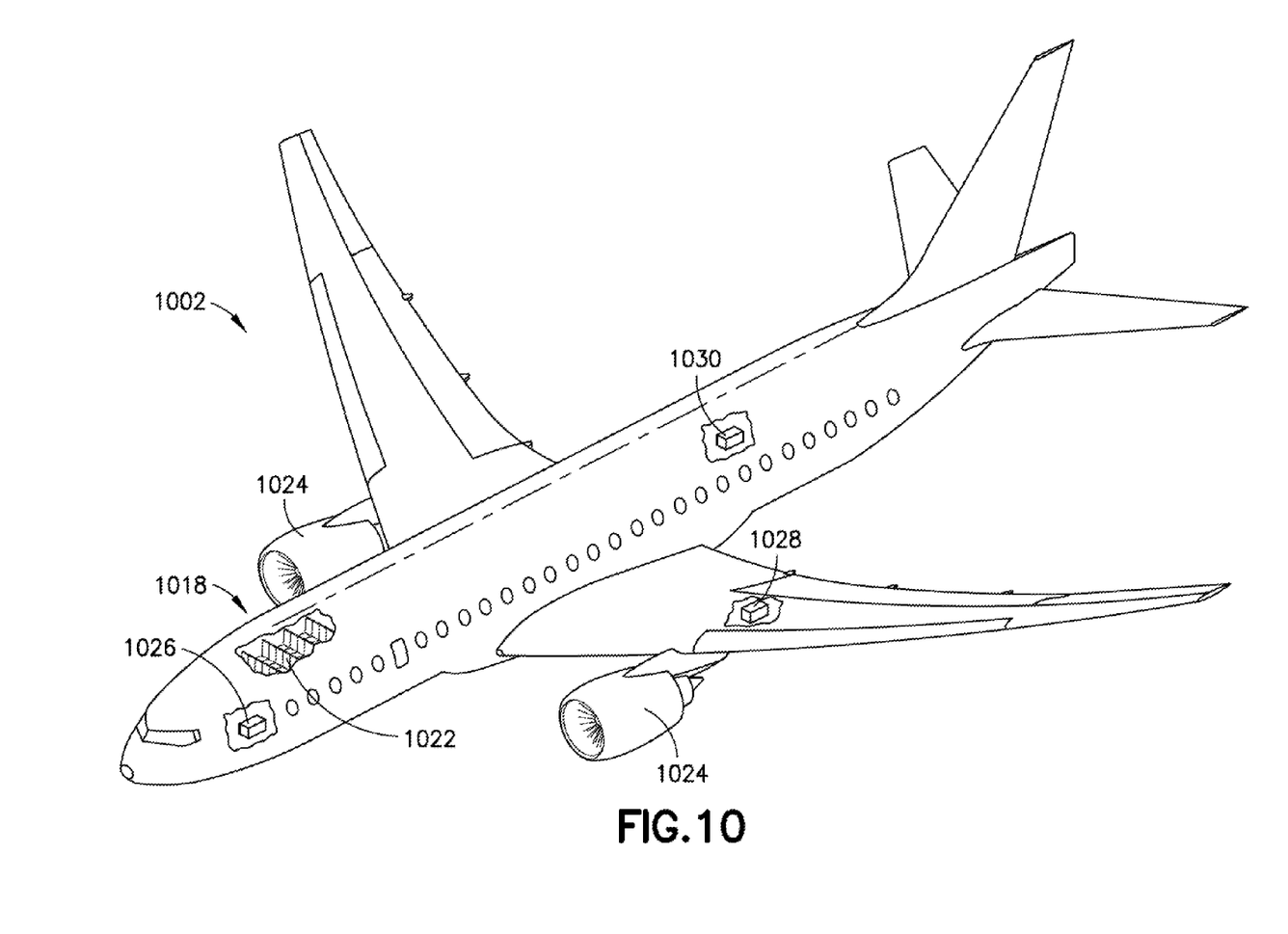
FIG. 10 is a schematic illustration of an aircraft including distributed vehicle systems.

Examples of the disclosure may be described in the context of an aircraft manufacturing and service method 900 as shown in FIG. 9 and an aircraft 1002 as shown in FIG. 10. During pre-production, illustrative method 900 may include specification and design 900 of the aircraft 1002 and material procurement 906. During production, component and subassembly manufacturing 908 and system integration 910 of the aircraft 1002 take place. Thereafter, the aircraft 1002 may go through certification and delivery 912 to be placed in service 914. While in service by a customer, the aircraft 1002 is scheduled for routine maintenance and service 916 (which may also include modification, reconfiguration, refurbishment, and so on).

Each of the processes of the illustrative method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 1002 produced by the illustrative method 900 may include an airframe 1018 with a plurality of high-level systems and an interior 1022. Examples of high-level systems, which are distributed throughout the aircraft, include one or more of a propulsion system 1024, an electrical power system 1026 (which in one aspect includes an auxiliary power unit and sound attenuation member as described herein), a hydraulic system 1028, and an environmental system 1030. Any number of other systems may be included. Although an aerospace example is shown, the principles of the invention may be applied to other industries, such as the automotive and maritime industries.

Apparatus and methods shown or described herein may be employed during any one or more of the stages of the manufacturing and service method 900. For example, components or subassemblies corresponding to component and subassembly manufacturing 908 may be fabricated or manufactured in a manner similar to components or subassemblies produced while the aircraft 1002 is in service. Also, one or more aspects of the apparatus, method, or combination thereof may be utilized during the production states 908 and 910, for example, by substantially expediting assembly of or reducing the cost of an aircraft 1002. Similarly, one or more aspects of the apparatus or method realizations, or a combination thereof, may be utilized, for example and without limitation, while the aircraft 1002 is in service, e.g., operation, maintenance and service 916.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In one or more aspects of the present disclosure an aircraft auxiliary power unit sound attenuation apparatus includes a perforated body having a center aperture through which exhaust fluid passes; a backing member outwardly offset from the perforated body; a plurality of connecting members coupling the perforated body to the backing member to form a locally reacting sound attenuation member having a plurality of channels spanning outwardly from the perforated body to the backing member; and a bulk absorber disposed in each of the plurality of channels where the bulk absorber is in fluid communication with the exhaust fluid; wherein the locally reacting sound attenuation member is in fluid communication with an auxiliary power unit of an aircraft so that the plurality of channels are oriented in a direction crossing a pressure drop direction of an exhaust fluid flow passing through the center aperture and each channel circumscribes the center aperture.

In one or more aspects of the present disclosure each channel has a width in the direction crossing the pressure drop direction of the exhaust fluid that prevents sound propagation inside the channel substantially parallel to a surface of the channel in the direction of the pressure drop direction of the exhaust fluid.

In one or more aspects of the present disclosure the aircraft auxiliary power unit sound attenuation apparatus further includes at least one septum layer disposed between the perforated body and backing member where the at least one septum layer divides each channel into at least two portions.

In one or more aspects of the present disclosure the at least two portions are in fluid communication with each other.

In one or more aspects of the present disclosure the bulk absorber is disposed in at least one of the at least two portions of each channel.

In one or more aspects of the present disclosure the bulk absorbers comprises a first bulk absorber and a second bulk absorber that is different than the first bulk absorber, the first bulk absorber being disposed in one of the at least two portions and the second bulk absorber being disposed in another of the at least two portions.

In one or more aspects of the present disclosure one of the at least two portions comprises a liquid drainage path.

In one or more aspects of the present disclosure each of the plurality of connecting members has a circumferentially extending sinewave configuration.

In one or more aspects of the present disclosure the locally reacting sound attenuation member has a longitudinal axis that extends along the direction of exhaust fluid flow and each of the plurality of connecting members circumferentially extends substantially linearly around the longitudinal axis.

In one or more aspects of the present disclosure the locally reacting sound attenuation member has a longitudinal axis that extends along the direction of exhaust fluid flow and the plurality of connecting members forms a truss core that circumferentially extends around the longitudinal axis.

In one or more aspects of the present disclosure the perforated body has a percent open area of about 15 percent or greater.

In one or more aspects of the present disclosure the plurality of channels are oriented in a direction that is substantially normal to the pressure drop direction of the exhaust fluid flow.

In one or more aspects of the present disclosure the perforated body includes perforations that place the bulk absorber in each channel in fluid communication with the exhaust fluid flow.

In one or more aspects of the present disclosure the perforated body, the backing member and the plurality of connecting members comprise titanium.

In one or more aspects of the present disclosure the perforated body, the backing member and the plurality of connecting members comprise inconel.

In one or more aspects of the present disclosure the perforated body, the backing member and the plurality of connecting members comprise a nickel alloy.

In one or more aspects of the present disclosure the perforated body, the backing member and the plurality of connecting members comprise a ceramic matrix composite.

In one or more aspects of the present disclosure at least one of the perforated body and the backing member includes an access panel that provides access to the bulk absorber in each channel.

In one or more aspects of the present disclosure each channel is a continuous channel.

In one or more aspects of the present disclosure an aircraft auxiliary power unit includes an exhaust outlet; a locally reacting sound attenuation member in fluid communication with the exhaust outlet, the locally reacting sound attenuation member including a perforated body having a center aperture through which exhaust fluid passes, a backing member outwardly offset from the perforated body, a plurality of connecting members coupling the perforated body to the backing member to form a locally reacting sound attenuation member having a plurality of channels spanning outwardly from the perforated body to the backing member; and a bulk absorber disposed in each of the plurality of channels where the bulk absorber is in fluid communication with the exhaust fluid; wherein the locally reacting sound attenuation member is in fluid communication with the exhaust outlet so that the plurality of channels are oriented in a direction crossing a pressure drop direction of an exhaust fluid flow passing through the center aperture and each channel circumscribes the center aperture.

In one or more aspects of the present disclosure each channel has a width in the direction crossing the pressure drop direction of the exhaust fluid that prevents sound propagation inside the channel substantially parallel to a surface of the channel in the direction of the pressure drop direction of the exhaust fluid.

In one or more aspects of the present disclosure the locally reacting sound attenuation member further includes at least one septum layer disposed between the perforated body and backing member where the at least one septum layer divides each channel into at least two portions.

In one or more aspects of the present disclosure the at least two portions are in fluid communication with each other.

In one or more aspects of the present disclosure the bulk absorber is disposed in at least one of the at least two portions of each channel.

In one or more aspects of the present disclosure the bulk absorbers comprises a first bulk absorber and a second bulk absorber that is different than the first bulk absorber, the first bulk absorber being disposed in one of the at least two portions and the second bulk absorber being disposed in another of the at least two portions.

In one or more aspects of the present disclosure one of the at least two portions comprises a liquid drainage path.

In one or more aspects of the present disclosure each of the plurality of connecting members has a circumferentially extending sinewave configuration.

In one or more aspects of the present disclosure the locally reacting sound attenuation member has a longitudinal axis that extends along the direction of exhaust fluid flow and each of the plurality of connecting members circumferentially extends substantially linearly around the longitudinal axis.

In one or more aspects of the present disclosure the locally reacting sound attenuation member has a longitudinal axis that extends along the direction of exhaust fluid flow and the plurality of connecting members forms a truss core that circumferentially extends around the longitudinal axis.

In one or more aspects of the present disclosure the perforated body has a percent open area of about 15 percent or greater.

In one or more aspects of the present disclosure the plurality of channels are oriented in a direction that is substantially normal to the pressure drop direction of the exhaust fluid flow.

In one or more aspects of the present disclosure the perforated body includes perforations that place each channel in fluid communication with the fluid flow.

In one or more aspects of the present disclosure the perforated body, the backing member and the plurality of connecting members comprise titanium.

In one or more aspects of the present disclosure the perforated body, the backing member and the plurality of connecting members comprise inconel.

In one or more aspects of the present disclosure the perforated body, the backing member and the plurality of connecting members comprise a nickel alloy.

In one or more aspects of the present disclosure the perforated body, the backing member and the plurality of connecting members comprise a ceramic matrix composite.

In one or more aspects of the present disclosure at least one of the perforated body and the backing member includes an access panel that provides access to the bulk absorber in each channel.

In one or more aspects of the present disclosure each channel is a continuous channel.

In one or more aspects of the present disclosure a method for aircraft auxiliary power unit sound attenuation includes flowing fluid in an exhaust outlet of an aircraft auxiliary power unit; receiving at least a portion of the fluid in perforations of the exhaust outlet so that the portion of the fluid flows through the perforations into at least one radial channel of the exhaust outlet; and attenuating acoustic waves with a bulk absorber disposed within each of the at least one radial channel.

In one or more aspects of the present disclosure attenuating the acoustic waves includes preventing sound propagation inside the channel substantially parallel to a surface of the channel in a direction of a pressure drop direction of the fluid.

In one or more aspects of the present disclosure the method further includes heating the bulk absorber with the portion of the fluid to vaporize liquids contained within the bulk absorber.

In one or more aspects of the present disclosure the method further includes providing access to the bulk absorber through at least one surface of the exhaust outlet.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. An aircraft auxiliary power unit sound attenuation apparatus comprising:
   a perforated body having a center aperture through which exhaust fluid passes;
   a backing member outwardly offset from the perforated body;
   a plurality of connecting members coupling the perforated body to the backing member to form a locally reacting sound attenuation member having a plurality of channels spanning outwardly from the perforated body to the backing member;
   at least one septum layer disposed between the perforated body and backing member where the at least one septum layer divides each channel into at least two portions; and
   a bulk absorber disposed in each of the plurality of channels where the bulk absorber is in fluid communication with the exhaust fluid;
   wherein the locally reacting sound attenuation member is in fluid communication with an auxiliary power unit of an aircraft so that the plurality of channels are oriented in a direction crossing a pressure drop direction of an exhaust fluid flow passing through the center aperture and each channel circumscribes the center aperture.

2. The aircraft auxiliary power unit sound attenuation apparatus of claim 1, wherein each channel has a width in the direction crossing the pressure drop direction of the exhaust fluid, the width of each channel is configured such that the width prevents sound propagation inside the channel substantially parallel to a surface of the channel in the direction of the pressure drop direction of the exhaust fluid.

3. The aircraft auxiliary power unit sound attenuation apparatus of claim 1, further comprising a liquid drainage path in one of the at least two portions of a respective channel.

4. The aircraft auxiliary power unit sound attenuation apparatus of claim 1, wherein each of the plurality of connecting members extends radially from the perforated body so as to form a wall of a respective channel where the wall has a circumferentially extending sinewave configuration that undulates in a circumferential direction around the perforated body.

5. The aircraft auxiliary power unit sound attenuation apparatus of claim 1, wherein the locally reacting sound attenuation member has a longitudinal axis that extends along the direction of exhaust fluid flow and each of the plurality of connecting members circumferentially extends substantially linearly around the longitudinal axis.

6. The aircraft auxiliary power unit sound attenuation apparatus of claim 1, wherein the locally reacting sound attenuation member has a longitudinal axis that extends along the direction of exhaust fluid flow and the plurality of connecting members forms a truss core that circumferentially extends around the longitudinal axis.

7. The aircraft auxiliary power unit sound attenuation apparatus of claim 1, wherein the plurality of channels are oriented in a direction that is substantially normal to the pressure drop direction of the exhaust fluid flow.

8. The aircraft auxiliary power unit sound attenuation apparatus of claim 1, wherein the perforated body includes perforations that place the bulk absorber in each channel in fluid communication with the exhaust fluid flow.

9. The aircraft auxiliary power unit sound attenuation apparatus of claim 1, further comprising a first bulk absorber disposed in one of the at least two portions of a respective channel and a second bulk absorber, that is different than the first bulk absorber, disposed in another of the at least two portions of the respective channel.

10. An aircraft auxiliary power unit comprising:
    an exhaust outlet;
    a locally reacting sound attenuation member in fluid communication with the exhaust outlet, the locally reacting sound attenuation member including
      a perforated body having a center aperture through which exhaust fluid passes,
      a backing member outwardly offset from the perforated body,
      a plurality of connecting members coupling the perforated body to the backing member to form a locally reacting sound attenuation member having a plurality of channels spanning outwardly from the perforated body to the backing member;
    at least one seam layer disposed between the perforated body and backing member where the at least one septum layer divides each channel into at least two portions; and
    a bulk absorber disposed in each of the plurality of channels where the bulk absorber is in fluid communication with the exhaust fluid;
    wherein the locally reacting sound attenuation member is in fluid communication with the exhaust outlet so that the plurality of channels are oriented in a direction crossing a pressure drop direction of an exhaust fluid flow passing through the center aperture and each channel circumscribes the center aperture.

11. The aircraft auxiliary power unit of claim 10, wherein each channel has a width in the direction crossing the pressure drop direction of the exhaust fluid, the width of each channel is configured such that the width prevents sound propagation inside the channel substantially parallel to a surface of the channel in the direction of the pressure drop direction of the exhaust fluid.

12. The aircraft auxiliary power unit of claim 10, wherein the locally reacting sound attenuation member further includes a liquid drainage path in one of the at least two portions of a respective channel.

13. The aircraft auxiliary power unit of claim 10, wherein each of the plurality of connecting members extends radially from the perforated body so as to form a wall of a respective channel where the wall has a circumferentially extending sinewave configuration that undulates in a circumferential direction around the perforated body.

14. The aircraft auxiliary power unit of claim 10, wherein the locally reacting sound attenuation member has a longitudinal axis that extends along the direction of exhaust fluid flow and each of the plurality of connecting members circumferentially extends substantially linearly around the longitudinal axis.

15. The aircraft auxiliary power unit of claim 10, wherein the locally reacting sound attenuation member has a longitudinal axis that extends along the direction of exhaust fluid flow and the plurality of connecting members forms a truss core that circumferentially extends around the longitudinal axis.

16. The aircraft auxiliary power unit of claim 10, wherein the plurality of channels are oriented in a direction that is substantially normal to the pressure drop direction of the exhaust fluid flow.

17. The aircraft auxiliary power unit of claim 10, wherein at least one of the perforated body and the backing member includes an access panel that is configured for passage of the bulk absorber through the access panel to provide access to the bulk absorber in each channel.

18. The aircraft auxiliary power unit of claim 10, further comprising a first bulk absorber disposed in one of the at least two portions of a respective channel and a second bulk absorber, that is different than the first bulk absorber, disposed in another of the at least two portions of the respective channel.

19. A method for aircraft auxiliary power unit sound attenuation, the method comprising:

flowing fluid in an exhaust outlet of an aircraft auxiliary power unit;

receiving at least a portion of the fluid in perforations of the exhaust outlet so that the portion of the fluid flows through the perforations into at least one radial channel of the exhaust outlet where the at least one radial channel is divided into at least two portions by at least one septum layer disposed within the at least one radial channel; and attenuating acoustic waves with a bulk absorber disposed within each of the at least one radial channel.

20. The method of claim 19, wherein attenuating the acoustic waves includes attenuating the acoustic waves with a width of the at least one radial channel where the width prevents sound propagation inside the channel substantially parallel to a surface of the channel in a direction of a pressure drop direction of the fluid.

21. The method of claim 19, further comprising heating the bulk absorber with the portion of the fluid to vaporize liquids contained within the bulk absorber.

22. The method of claim 19, further comprising providing access to the bulk absorber through at least one surface of the exhaust outlet through an access panel that is configured for passage of the bulk absorber through the access panel.

* * * * *